March 1, 1966     E. WUNSCH     3,237,471
VARIABLE-PITCH SHEAVE
Filed Jan. 31, 1964
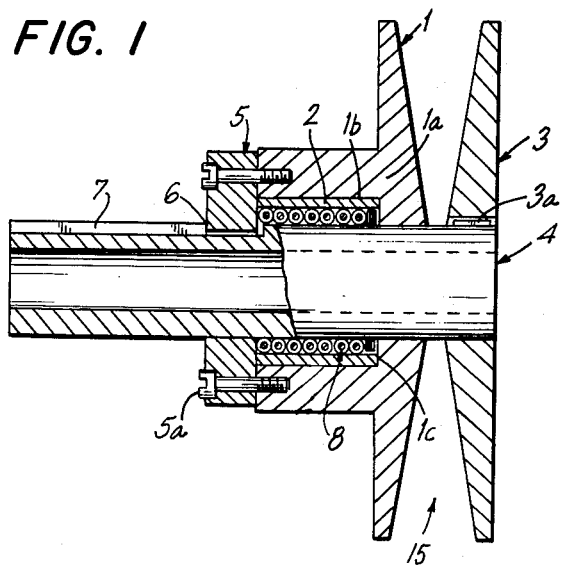
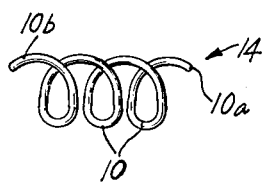
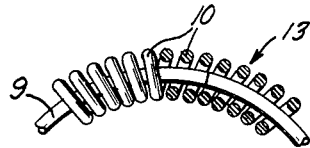
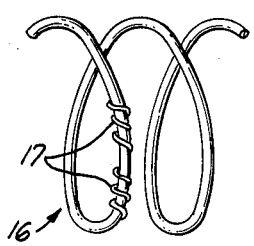
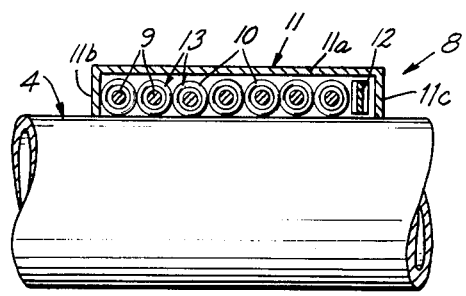
INVENTOR:
ERICH WUNSCH
BY
Michael J. Striker
his ATTORNEY United States Patent Office 3,237,471
Patented Mar. 1, 1966

3,237,471
VARIABLE-PITCH SHEAVE
Erich Wunsch, Eulenweg, Saarlouis, Germany, assignor to Ernst Heinkel Aktiengesellschaft, Stuttgart-Zuffenhausen, Germany
Filed Jan. 31, 1964, Ser. No. 341,586
Claims priority, application Germany, Feb. 11, 1963, H 48,199
15 Claims. (Cl. 74—230.17)

The present invention relates to variable-pitch sheaves in general, and more particularly to improved bearings for axially movable flanges of such sheaves.

In conventional variable-pitch sheaves which are used in infinitely variable belt transmissions, the movable flange is normally mounted on an antifriction bearing whose balls form an annulus around the periphery of the shaft which carries the fixed flange. A serious drawback of such bearings is that the balls are in mere point contact with the periphery of the shaft and will cause considerable wear in response to axial displacements of the movable flange. Such movements are due to variations in the width of the belt or rope which is trained around the sheave, i.e., the movable flange actually reciprocates on the shaft in directions toward and away from the fixed flange whenever the sheave is in actual use. In order to reduce wear, the balls must be surface-hardened so that they retain their shape and actually roll (rather than slide) along the periphery of the shaft. Another serious drawback of such bearings is that the balls occupy too much space, as seen in the radial direction of the sheave, so that the diameter of the shaft must be reduced accordingly. However, if the diameter of the shaft is reduced, its peripheral surface is also reduced so that only a few balls may be assembled to form an annulus about the shaft. The periphery of the shaft is normally treated to insure that the material which is adjacent thereto is sufficiently hard to prevent excessive wear in response to repeated rolling contact with the balls. Such treatment of the balls and/or of the shaft adds to the initial cost of the sheave, and it was found that even a surface-hardened shaft cannot withstand excessive wear if the belt is maintained under considerable tension and if it is called upon to transmit substantial forces which develop when a variable-pitch sheave is used in a power transmission.

Accordingly, it is an important object of the invention to provide a novel bearing for movable flanges of variable-pitch sheaves and similar structures wherein a second member surrounds the periphery of and is movable axially along a first member, and it is also an object of the invention to construct the bearing in such a way that the wear on its rolling elements and on the parts in contact therewith is reduced.

Another object of the invention is to provide a bearing for the movable flange of a variable-pitch sheave and to construct the bearing in such a way that a defective rolling element may be readily exchanged so that the remaining parts of the bearing may be reassembled and put to renewed use.

A further object of the invention is to provide a bearing of the just outlined characteristics whose elements are inexpensive mass-produced parts which need not undergo surface hardening or similar expensive and time-consuming treatments.

An additional object of the invention is to provide a bearing of the above described character which occupies little room so that the movable flange may be mounted on a shaft of large diameter, and to provide a bearing whose elements come in contact with the periphery of the shaft at a plurality of points so that each element of the bearing is required to transmit comparatively small forces such as will result in negligible wear on the sheave.

A concomitant object of the invention is to provide a bearing which is equally useful in heavy-duty sheaves as well as in comparatively lightweight sheaves, and which may be assembled of scrap material.

Still another object of the invention is to provide a variable-pitch sheave which embodies a bearing of the above outlined characteristics.

With the above objects in view, one feature of the invention resides in the provision of a variable-pitch sheave which comprises a shaft, a flange including a central portion which is axially movably mounted on the shaft, and a novel bearing which is disposed between the central portion of the flange and the periphery of the shaft. The bearing comprises at least one bearing element including an annulus of helical convolutions which are arranged to roll along the periphery of the shaft in response to axial movements of the flange. Each annulus preferably comprises a series of arcuate sections disposed end-to-end and each section preferably comprises a plurality of helical convolutions. In order to facilitate the insertion or removal of the annuli, it is preferred to provide substantially ring-shaped carriers and to string the convolutions onto the respective carriers.

The annuli of convolutions roll along the periphery of the shaft when the width of the belt or rope is not constant and also when the sheave is adjusted to change the distance between the flanges in order to vary the effective diameter of the sheave and consequently the speed ratio of the drive.

The novel features which are considered as characteristic of the invention are set forth in particular in the appended claims. The improved variable-pitch sheave itself, however, both as to its construction and the mode of assembling the same, together with additional features and advantages thereof, will be best understood upon perusal of the following detailed description of certain specific embodiments with reference to the accompanying drawings, in which:

FIG. 1 is an axial section through a variable-pitch sheave which embodies one form of my invention;

FIG. 2 is an enlarged fragmentary axial section through a fully assembled bearing which includes a series of coaxial bearing elements;

FIG. 3 is an enlarged fragmentary partly elevational and partly sectional view of a bearing element which may be utilized in the bearing of FIG. 2;

FIG. 4 is a side elevational view of a section consisting of several helical convolutions and forming part of a bearing element; and FIG. 5 is a fragmentary perspective view of a modified bearing which comprises a spiral-shaped carrier for a series of annuli.

Referring to the drawings, and first to FIG. 1, there is shown a variable-pitch sheave comprising a shaft 4 which carries a fixed flange 3 secured thereto by a key 3a and a movable flange 1 having a central portion or hub 1a which is movable axially and which surrounds the periphery of the shaft 4. The shaft is formed with a peripheral channel 7 which receives a radially inwardly extending projection 6 provided on a retaining ring 5 which is secured to the lefthand end face of the hub 1a by a series of bolts 5a. The ring 5 holds the movable flange 1 against rotation with reference to the shaft 4 and acts as a stop for a cylindrical bearing sleeve 2 which is accommodated in a cylindrical recess 1b machined in the internal surface of the hub 1a. The space between the internal surface of the sleeve 2 and the periphery of the shaft 4 accommodates a bearing, generally indicated by a numeral 8, which is constructed and assembled in accordance with one embodiment of my invention.

As shown in FIG. 2, the bearing 8 comprises a cage 11 including a cylindrical shell 11a which is spaced from the periphery of the shaft 4 and two annular end walls 11b, 11c which are disposed at the axial ends of the shell 11a and extend inwardly toward the shaft. The chamber defined by the shaft 4 and cage 11 accommodates a series of coaxial bearing elements 13 each of which comprises an annulus of closely adjacent helical convolutions 10 consisting of metallic wire and a ring-shaped carrier 9. The convolutions 10 are strung onto the respective carriers so that they may rotate thereabout, and the bearing 8 further comprises resilient means, here shown as a ring-shaped flat spring 12 which is corrugated or undulated and serves to bias the bearing elements 13 against each other and to bias the leftmost bearing element against the end wall 11b. Thus, the end wall 11b actually constitutes a stop and cooperates with the spring 12 to prevent axial movements of the bearing elements 13 with reference to each other and to hold the annuli against movements into planes which are not perpendicular to the axis of the shaft 4. This is particularly important when the diameter of the shaft 4 is comparatively small.

The construction of a bearing element 13 is shown on a greater scale in FIG. 3, and it will be noted that the carrier 9 is a split ring whose ends may be moved apart so that it may be introduced into the convolutions 10. In order to insure that the convolutions 10 will rotate freely about the respective carriers, each annulus of convolutions is preferably assembled of arcuate sections 14 which are disposed end-to-end and each of which comprises a series of convolutions having the same outer diameter. One such section 14, in undeformed condition thereof, is illustrated in FIG. 4. It will be noted that the ends of the outermost convolutions 10a, 10b which form part of the section 14 are rounded. When the sections 14 are assembled to form annuli of convolutions, they are deformed and resemble arcs whose center of curvature is located on the axis of the shaft 4.

When the bearing 8 is properly installed in the recess 1b, the cage 11 is surrounded by the sleeve 2 and its end walls 11b, 11c respectively abut against the retaining ring 5 and against a radially extending internal shoulder 1c of the hub 1a. If the flange 1 thereupon performs axial movements, such as will be caused by variations in the width of a belt which is trained around the sheave so as to enter the groove 15 which is defined by the flanges 1 and 3, the convolutions 10 will roll along the periphery of the shaft 4 and will insure that the wear on the shaft is less than if the bearing were assembled of balls or similar rolling elements. This is due to the fact that the periphery of the shaft 4 is in contact with a large number of convolutions which are closely adjacent to each other so that each convolution transmits comparatively small forces. The diameters of the convolutions are rather small so that the entire bearing occupies little room and the diameter of the shaft 4 need not be reduced for the purpose of accommodating the bearing.

The convolutions 10 preferably consist of metallic stock such as is used in connection with Bowden wires, and they may be precision finished to insure that the diameters of all convolutions are the same.

If the bearing of this invention is to be utilized in a heavy-duty sheave, the carriers 9 may be replaced by a single carrier 16, which resembles a spiral, see FIG. 5, and which is threaded through a series of arcuate sections 17 each of which comprises a plurality of helical convolutions. FIG. 5 merely shows two sections 16 which are spaced apart for the sake of clarity but, when the bearing is fully assembled, the sections 17 are disposed end-to-end and actually conceal the carrier 16. The spiral carrier 16 comprises a plurality of substantially ring-shaped carriers which are integrally connected to each other so that the annuli of convolutions on the carrier 16 also form a spiral and that each section 17 is free to rotate about the respective spiral portion of the carrier. Such spiral carriers may be used in all types of bearings where the fact that the spiral has a lead does not affect the operation of the bearing and/or of the sheave.

It goes without saying that the bearing of this invention may be used in devices other than variable-pitch sheaves in which a first member is movable axially along the cylindrical periphery of a second member.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A variable-pitch sheave, comprising a shaft; a flange including a central portion axially movably mounted on said shaft; and a bearing disposed between said central portion and the periphery of said shaft, said bearing including at least one bearing element which comprises an annulus of helical convolutions arranged to roll along the periphery of said shaft in response to axial movements of said flange.

2. A variable-pitch sheave, comprising a shaft; a flange including a central portion axially movably mounted on said shaft; and a bearing disposed between said central portion and the periphery of said shaft, said bearing including at least one bearing element which comprises an annulus of helical convolutions arranged to roll along the periphery of said shaft in response to axial movements of said flange, said annulus comprising a plurality of arcuate sections disposed end-to-end and each including a plurality of convolutions.

3. A variable-pitch sheave, comprising a shaft; a flange including a central portion axially movably mounted on said shaft; and a bearing disposed between said central portion and the periphery of said shaft, said bearing including at least one bearing element which comprises a substantially ring-shaped carrier surrounding the periphery of said shaft and an annulus of helical convolutions strung onto said carrier and arranged to roll along the periphery of said shaft in response to axial movements of said flange.

4. A variable-pitch sheave, comprising a shaft; a flange including a central portion axially movably mounted on said shaft; and a bearing disposed between said central portion and the periphery of said shaft, said bearing including at least one bearing element which comprises an annulus of helical convolutions having identical outer diameters and arranged to roll along the periphery of said shaft in response to axial movements of said flange.

5. A variable-pitch sheave, comprising a shaft; a flange including a central portion axially movably mounted on said shaft; and a bearing disposed between said central portion and the periphery of said shaft, said bearing including at least one bearing element which comprises an annulus of helical convolutions arranged to roll along the periphery of said shaft in response to axial movements of said flange, said annulus consisting of a plurality of arcuate sections disposed end-to-end and each comprising a plurality of convolutions including two outermost convolutions having rounded ends.

6. A variable-pitch sheave, comprising a shaft; a flange including a central portion axially movably mounted on said shaft; and a bearing disposed between said central portion and the periphery of said shaft, said bearing comprising a plurality of coaxial bearing elements each of which includes an annulus of helical convolutions arranged to roll along the periphery of said shaft in response to axial movements of said flange.

7. A variable-pitch sheave, comprising a shaft; a flange including a central portion axially movably mounted on said shaft; and a bearing disposed between said central portion and the periphery of said shaft, said bearing including a plurality of bearing elements each of which comprises a substantially ring-shaped carrier surrounding the periphery of said shaft and an annulus of helical convolutions strung onto the respective carrier and arranged to roll along the periphery of said shaft in response to axial movements of said flange.

8. A variable-pitch sheave, comprising a shaft; a flange including a central portion axially movably mounted on said shaft; and a bearing disposed between said central portion and the periphery of said shaft, said bearing including a bearing element which comprises a spiral carrier surrounding the periphery of said shaft and at least one annulus of helical convolutions strung onto said carrier and arranged to roll along the periphery of said shaft in response to axial movements of said flange.

9. A variable-pitch sheave, comprising a shaft; a flange including a central portion axially movably mounted on said shaft; and a bearing disposed between said central portion and the periphery of said shaft, said bearing including a bearing element which comprises a spiral carrier having a plurality of spiral portions surrounding the periphery of said shaft and annuli of helical convolutions strung onto the spiral portions of said carrier and arranged to roll along the periphery of said shaft in response to axial movements of said flange.

10. A variable-pitch sheave, comprising a shaft; a flange including a central portion axially movably mounted on said shaft; and a bearing disposed between said central portion and the periphery of said shaft, said bearing including annular stop means extending radially outwardly from the periphery of said shaft, a plurality of closely adjacent coaxial annuli of helical convolutions arranged to roll along the periphery of said shaft in response to axial movements of said flange, and resilient means for biasing said annuli in a direction toward said stop means.

11. A variable-pitch sheave, comprising a shaft; a flange including a central portion axially movably mounted on said shaft; and a bearing disposed between said central portion and the periphery of said shaft, said bearing including a cage having a cylindrical shell coaxially surrounding and spaced from the periphery of said shaft, a pair of annular end walls disposed at the axial ends of said shell and extending radially inwardly toward the periphery of said shaft, a plurality of closely adjacent coaxial annuli of helical convolutions surrounded by said shell and arranged to roll along the periphery of said shaft in response to axial movements of said flange, and resilient means disposed between one of said end walls and said annuli to bias said annuli in the axial direction of said shaft and toward the other end wall.

12. A variable-pitch sheave as set forth in claim 11, wherein said resilient means comprises a ring-shaped corrugated spring which abuts against said one end wall and against the nearest annulus.

13. A variable-pitch sheave, comprising a shaft; a flange including a central portion axially movably mounted on said shaft; a cylindrical sleeve coaxially received in said central portion and spacedly surrounding the periphery of said shaft; and a bearing disposed between said sleeve and the periphery of said shaft, said bearing including annular stop means extending radially outwardly from the periphery of said shaft, a plurality of closely adjacent coaxial annuli of helical convolutions arranged to roll along the periphery of said shaft in response to axial movements of said flange, and resilient means for biasing said annuli in a direction toward said stop means.

14. A variable-pitch sheave, comprising a shaft; a first flange having a central portion coaxially mounted on and secured to said shaft; a second flange including a central portion axially movably mounted on said shaft so that said flanges define between themselves an annular groove of variable width; and a bearing disposed between the central portion of said second flange and the periphery of said shaft, said bearing including at least one annulus of helical convolutions arranged to roll along the periphery of said shaft in response to axial movements of said second flange.

15. A structure of the character described, comprising a first member having a cylindrical periphery; a second member surrounding said periphery and being movable axially of said first member; and a bearing disposed between said members and including at least one bearing element which comprises an annulus of helical convolutions arranged to roll along the periphery of said first member in response to axial movements of said second member.

No references cited.

DON A WAITE, *Primary Examiner.*

L. H. GERIN, *Assistant Examiner.*